May 6, 1952     W. CURETON     2,595,513
COUPLING FOR ROTATING SHAFTS
Filed April 28, 1950
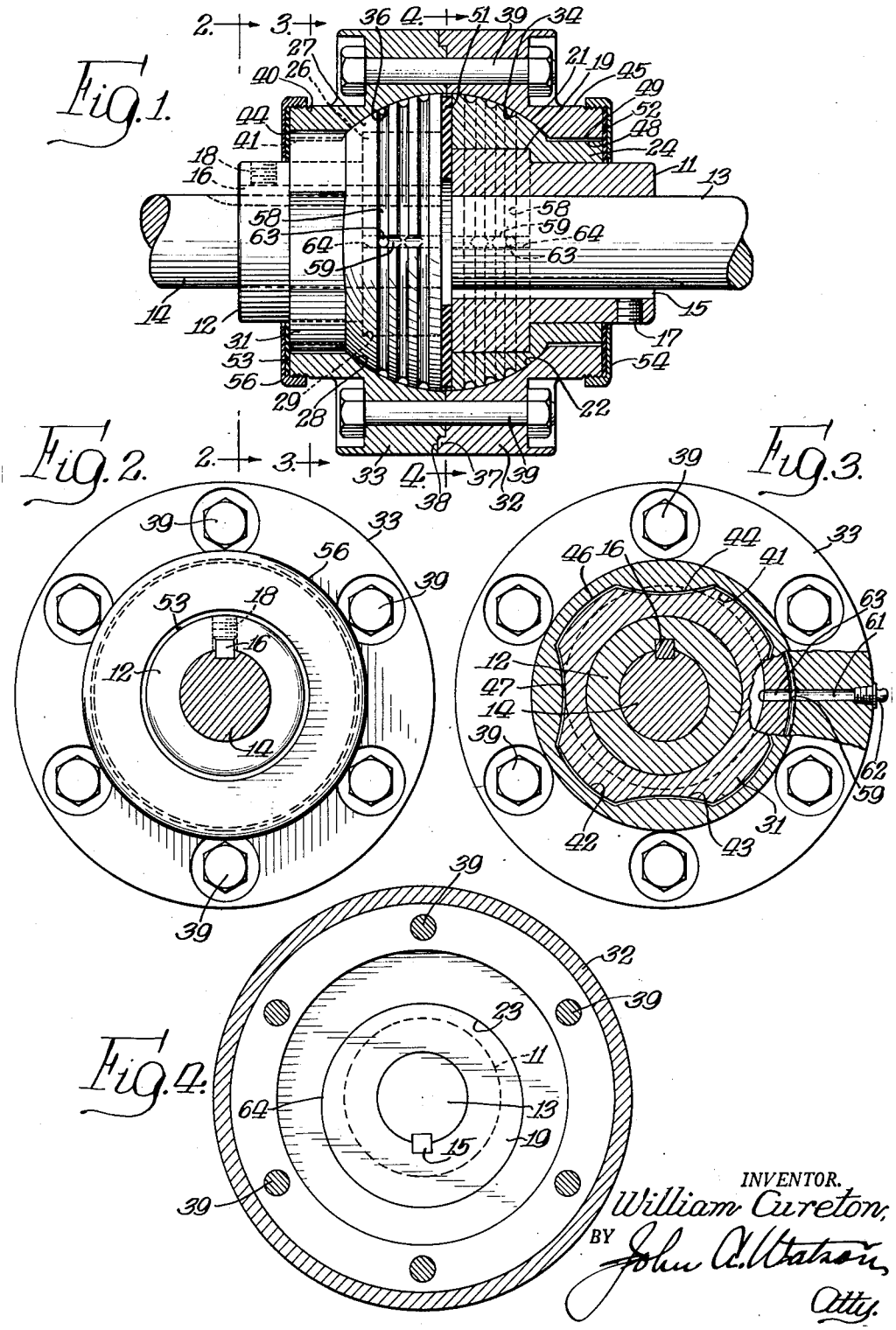
INVENTOR.
William Cureton,
BY John A. Watson
Atty.

Patented May 6, 1952

2,595,513

UNITED STATES PATENT OFFICE 2,595,513

COUPLING FOR ROTATING SHAFTS

William Cureton, Oak Park, Ill.

Application April 28, 1950, Serial No. 158,766

10 Claims. (Cl. 64—9)

This invention relates generally to couplings for rotating shafts and relates particularly to a shaft coupling capable of accommodating angular displacement of the shaft axes with respect to each other.

A principal object of the invention is to afford a construction for connecting a driving and driven shaft in such a fashion that the driving connection will not be disturbed by displacement of the shaft axes angularly with respect to each other.

Another object is to provide a construction for drivably connecting a pair of rotating shafts which are normally aligned but which may have a small amount of misalignment, said connection being characterized by the use of power transmitting members which are symmetrical with respect to the ends of the shafts it is desired drivably to connect.

Yet another object is to provide a shaft coupling consisting of a hub having an eccentric thereon which nests within a swivel member having a matching eccentric formed therein, the swivel member having a spline thereon which cooperates with a spline in a housing completing the coupling and so arranged that the splined connection afforded will enable the shafts so connected to have displacement with respect to each other.

Still another object is to enable a shaft coupling of the kind contemplated to be completely sealed against the entrance of foreign material and to be kept in lubricated condition, the swivel member being provided with annular grooves for retention and distribution of lubricant, and the swivel member being further provided with passages for lubricant to the matching eccentric surfaces of the swivel and the hub.

Other important features and objects of the present invention will be apparent from a study of the following description taken with the drawing, which together illustrate a preferred embodiment of the invention and what is now considered to be the best mode of applying the principles thereof. The invention is not intended to be limited in terms of the embodiment shown nor otherwise than by the terms of the appended claims.

In the drawings:

Fig. 1 is a longitudinal sectional view through a shaft coupling according to the present invention, certain parts thereof being shown in elevation;

Fig. 2 is an end view of the shaft coupling shown in Fig. 1 looking in the direction of the arrows 2—2;

Fig. 3 is a transverse section taken along the line 3—3 of Fig. 1 looking in the direction of the arrows; and Fig. 4 is a transverse section taken along the line 4—4 of Fig. 1 looking in the direction of the arrows.

Referring now to the drawing, the shaft coupling according to the present invention includes a pair of hubs 11 and 12 which are secured respectively to shafts 13 and 14 by keys 15 and 16. A set screw 17 holds the hub 11 against endwise movement on the shaft 13 and the key 15, and a set screw 18 likewise holds the hub 12 against endwise movement on the shaft 14 and the key 16.

The hub 11 is formed at its end adjacent the end of the shaft 13 with an external eccentric 19. A swivel member 21 having an exterior hemispherical surface 22 is formed with an internal eccentric 23 mating with the external eccentric 19 and with a bored flange 24 in such a fashion as to turn with the hub 11 and be supported thereon, see also Fig. 4.

The hub 12 is likewise formed at its end adjacent the end of the shaft 14 with an external eccentric 26. A swivel member 27 having an exterior hemispherical surface 28 is formed with an internal eccentric surface 29 mating with the external eccentric 26. The swivel member 27 is also formed with a bored flange 31 in such a fashion that the swivel member 27 turns with the hub 12 and is supported thereon. The hubs 11 and 12 together with their respective eccentrics 19 and 26 are located 180° apart on the shafts 13 and 14. It will be seen that the eccentrics 19 and 26 afford a driving connection with the respective swivel members 21 and 27 and that the swivel members 21 and 27 turn with the shafts 13 and 14.

A pair of housing bells 32 and 33 enclose the hubs 11 and 12 and the swivel members 21 and 27 and have internal hemispherical surfaces 34 and 36 which respectively contact the hemispherical surfaces 23 and 28 of the swivel members 21 and 27. The housing bell 32 has an annular rib 37 and the housing bell 33 has a mating peripheral groove 38 where the housing bells 32 and 33 are joined. The housing bells 32 and 33 are drilled and countersunk at evenly spaced points therearound for bolts 39 which hold the bells 32 and 33 together.

A driving connection is afforded between the swivel members 21 and 27 with the housing bells 32 and 33 so that the rotation of the shaft 13 will be transmitted to the shaft 14 or vice versa. To this end the flange 31 of the swivel member 27 is provided with a spline 41 made up of arcs 42 having centers which lie on the center of the shaft 14 which are connected by arcs 43 having centers lying on a common circle having a center which is the turning center of the shafts 13 and 14. The housing bell 33 is likewise formed with a flange 40 having an internal spline 44 which is made up of arcs 46 having centers which lie on the normal turning center of the shaft 14 and which are connected by arcs 47 having centers which lie on the common circle forming a line of centers for the arcs 43. The splines 41 and 44 contact each other along either end of the arcs 43 and 47 to provide a driving connection. The arcs 42 and 43 are spaced from the arcs 46 and 47 except for the points of contact so that the shaft 14 may move with the hub 12 and the swivel member 27 angularly with respect to the housing bell 33 while still maintaining the driving connection.

The flange 24 of the swivel member 21 is likewise formed with a spline 48 which mates with an internal spline 49 formed within a flange 45 of the housing bell 32. The splines 48 and 49 are formed exactly like the splines 44 and 46 and likewise form a driving connection between the shaft 13, the hub 11, the swivel 21 and the housing bell 32 and so that the shaft 13 may move angularly with respect to the housing bell 32.

In the embodiment herein described the clearance between the matching splines of the housing and the swivel members is sufficient to provide approximately 1° of angular displacement of each shaft axis with respect to the housing, or in other words, a total of 2° of misalignment of the axes of the shafts to be coupled together. Obviously, of course, the clearance may be increased or decreased to accommodate greater or lesser degrees of misalignment.

A spreader washer 51 made of "neoprene" or other heat and oil-resistant material is held between the swivel members 21 and 27 and the eccentrics 19 and 26 and insures that the hemispherical surfaces of the swivel members 21 and 27 will be maintained in contact with the hemispherical surfaces of the housing bells 32 and 33.

It will be evident that springs may be inserted between the swivel members 21 and 27 in lieu of the resilient washer 51. Such springs may be retained in cylindrical recesses, not shown, of the swivel members 21 and 27 and spaced circumferentially therein.

The shaft coupling thus far described is sealed against the entrance of dirt or other foreign material by a pair of resilient annular seals 52 and 53 which respectively bear against the flanges 24 and 45 and the flanges 31 and 40. The annular seal 52 fits snugly on the hub 11 and the annular seal 53 fits snugly on the hub 12. The annular seal 52 is held in place by a retainer cap 54 threaded to the flange 45 and the annular seal 53 is likewise held in place by a retainer cap 56 threaded to the flange 40. It will be apparent that each resilient seal will flex sufficiently upon displacement of the hubs 11 and 12 yet maintaining a tight seal thereat at all times.

The shaft coupling according to the present invention is adapted to be completely distributed with lubricant along the internal surfaces thereof. To this end the hemispherical surfaces of the swivel members 21 and 27 are provided with a plurality of annular oil grooves 58. Each set of annular grooves 58 are intersected by a groove 59, see also Fig. 3, which in turn is intersected by a channel 61 terminating in a lubricant fitting 62.

The swivel members 21 and 27 each have radially extending lubricant channels 63 which intersect a lubricant groove 64 formed in the eccentrics 19 and 26. Normally the channels 63 are in register with the channel 61 so that the lubricant will readily be forced to the mating eccentric surfaces 19 and 23 and 26 and 29.

In assembling the shaft coupling according to the present invention the shafts 13 and 14 are turned so that the keyways for the keys 15 and 16 are 180° apart. The hubs 11 and 12 are then positioned on the ends of the shafts 13 and 14 and keyed into place with the eccentrics 19 and 26 positioned 180° apart. The swivel members 21 and 27 are then slipped over the hubs 11 and 12 respectively and the spreader washer 51 is inserted between the swivel members 21 and 27. The housing bells 32 and 33 are then mounted on their respective swivel members 21 and 27 and bolted together. Lastly, the seals 52 and 53 are slipped over the hubs 11 and 12 and held in position by the retainer caps 54 and 56. Lubricant is then forced into the coupling at the pressure fittings 62 located 180° apart in each housing bell 32 and 33, the lubricant circulating within the coupling by the channels formed in the swivel members 21 and 27.

In operation, driving torque is transmitted between the shafts 13 and 14 and through the medium of the connected housing bells 32 and 33, the swivel members 21 and 27, and the eccentrics 19 and 26. A driving connection is afforded between the swivel members and the hubs by the mating eccentrics, and a further driving connection is afforded by the mating spline connection between the swivel members and the housing bells. Should, for example, the shaft 13 become misaligned with respect to the shaft 14 the spline connection between swivel member 21 and housing bell 32 will still afford a driving connection irrespective of such misalignment. Any misalignment of shaft 14 likewise will not affect the driving connection, such misalignment being permitted by the spline connection between swivel member 27 and housing bell 33.

It will be appreciated that except for the housing bells, each half of the coupling is made like the other half, so that it is relatively immaterial which mating parts are assembled together on each shaft. This feature facilitates manufacture and assembly as will be readily understood.

The shaft coupling according to the present invention is thus characterized by the use of symmetrical parts which are easily mounted and assembled on the ends of a pair of shafts it is desired to connect together. The parts so assembled provide for limited misalignment of the shafts while still affording a driving connection between the shafts. The coupling according to the present invention is completely sealed against the entrance of foreign material and at the same time is maintained completely lubricated. While the invention is described in terms of an embodiment which it may assume in practice, it is not intended that the invention be limited in terms of the embodiment described nor otherwise than by the terms of the claims appended.

I claim:

1. In a flexible coupling for connecting a pair of shafts, a hub mounted on each shaft for rotation therewith, a substantially hemispherical swivel member mounted on each hub, means providing a driving connection between each swivel member and its associated hub comprising an eccentric formed on each hub and a mating internal eccentric formed in each swivel member, means forming a housing for enclosing said hubs and said swivel members comprising a pair of housing bells joined together and each having interior hemispherical surfaces contacting the hemispherical surfaces of said swivel members, means providing a driving connection between said swivel members and said housing comprising a spline formed in each of said housing bells and a matching spline formed on each of said swivel members, each pair of said splines having spline surfaces which are spaced from each other yet providing points of contact with each other to enable said shafts to be displaced with respect to each other while maintaining a driving connection therebetween.

2. In a flexible coupling connecting a pair of shafts, a hub mounted on each shaft for rotation therewith, a substantially hemispherical swivel member mounted on each hub, means providing a driving connection between each swivel member and its associated hub comprising an eccentric formed on each hub and spaced 180° from each other, and a mating internal eccentric formed in each swivel member, means forming a housing for enclosing said hubs and said swivel members comprising a pair of housing bells joined together and each having interior hemispherical surfaces contacting the hemispherical surfaces of said swivel members, means providing a driving connection between said swivel members and said housing comprising an internal spline formed in each of said housing bells and a matching external spline formed on each of said swivel members, said splines consisting of arc portions which lie on the normal turning center of said shafts and connecting arc portions having centers lying on a common circle having a center lying on the normal turning center of said shafts, the surfaces of each pair of said splines being spaced from each other except for points of contact in driving connection of said shafts to provide for displacement of said shafts while maintaining a driving connection therebetween.

3. In a flexible coupling for connecting a pair of shafts, a hub mounted on each shaft for rotation therewith, a substantially hemispherical swivel member mounted on each hub, means providing a driving connection between each swivel member and its associated hub comprising an eccentric formed on each hub and a mating internal eccentric formed in each swivel member, means forming a housing for enclosing said hubs and said swivel members comprising a pair of housing bells joined together and each having interior hemispherical surfaces contacting the hemispherical surfaces of said swivel members, means providing a driving connection between said swivel members and said housing comprising a spline formed in each of said housing bells and a matching spline formed on each of said swivel members, each pair of said splines having spline surfaces which are spaced from each other yet providing points of contact with each other to enable said shafts to be displaced with respect to each other while maintaining a driving connection therebetween, and means for sealing said coupling against the entrance of foreign material thereto comprising annular seals contacting said hubs and bearing against said swivel members and said housing bells, and seal retainers for holding each of said seals in position secured to each of said housing bells.

4. In a flexible coupling for connecting a pair of shafts, a hub mounted on each shaft for rotation therewith, a substantially hemispherical swivel member mounted on each hub, means providing a driving connection between each swivel member and its associated hub comprising an eccentric formed on each hub and a mating internal eccentric formed in each swivel member, means forming a housing for enclosing said hubs and said swivel members comprising a pair of housing bells joined together and each having interior hemispherical surfaces contacting the hemispherical surfaces of said swivel members, and means providing a driving connection between said swivel members and said housing comprising an internal spline formed in each of said housing bells and a matching external spline formed on each of said swivel members, said splines consisting of arc portions which lie on the normal turning center of said shafts and connecting arc portions having centers lying on a common circle having a center lying on the normal turning center of said shafts, the surfaces of each pair of said splines being spaced from each other except for points of contact in driving connection of said shafts to provide for displacement of said shafts while maintaining a driving connection therebetween.

5. In a flexible coupling for connecting a pair of shafts, a hub mounted on each shaft for rotation therewith, a substantially hemispherical swivel member mounted on each hub, means providing a driving connection between each swivel member and its associated hub comprising an eccentric formed on each hub and a mating internal eccentric formed in each swivel member, means forming a housing for enclosing said hubs and said swivel members comprising a pair of housing bells joined together and each having interior hemispherical surfaces contacting the hemispherical surfaces of said swivel members, means providing a driving connection between said swivel members and said housing comprising a spline formed in each of said housing bells and a matching spline formed on each of said swivel members, each pair of said splines having spline surfaces which are spaced from each other yet providing points of contact with each other to enable said shafts to be displaced with respect to each other while maintaining a driving connection therebetween, and a resilient annular shaped member lying between said swivel members and the ends of said shafts and said hubs for maintaining said matching hemispherical surfaces in contact with each other.

6. In a flexible coupling for connecting a pair of shafts, a hub mounted on each shaft for rotation therewith, a substantially hemispherical swivel member mounted on each hub, means providing a driving connection between each swivel member and its associated hub comprising an eccentric formed on each hub and a mating internal eccentric formed in each swivel member, means forming a housing for enclosing said hubs and said swivel members comprising a pair of housing bells joined together and each having interior hemispherical surfaces contacting the hemispherical surfaces of said swivel members, means providing a driving connection between said swivel members and said housing comprising a spline formed in each of said housing bells and a matching spline formed on each of said swivel members, each pair of said splines having spline surfaces which are spaced from each other yet providing points of contact with each other to enable said shafts to be displaced with respect to each other while maintaining a driving connection therebetween and means for providing distribution of lubricant within said coupling comprising connected annular lubricant passages in each swivel member, a lubricant groove in each of said eccentrics, connected to said annular lubricant passages, and a channel for lubricant in said housing bell intersecting said annular lubricant passages.

7. In a flexible coupling for connecting a pair of shafts, a hub member mounted on each shaft for rotation therewith, means providing a housing enclosing said hub members, and means for effecting a driving connection between each of said hub members and said housing means including an eccentric secured to each hub member, and substantially hemispherical members pivotally mounted within said housing means and having eccentric recesses formed therein and in mating engagement with said eccentrics secured to said hub members.

8. In a flexible coupling for connecting the ends of a pair of shafts, a hub member for each shaft end and secured thereto for rotation therewith, a housing enclosing said hub members and shaft ends, and means for effecting a driving connection between each of said hub members and said housing means including an external eccentric ring formed on each hub member and a pair of hemispherical members each embracing a hub member and each having an eccentric recess substantially conforming to and receiving the said external eccentric ring on the hub member respectively embraced thereby.

9. In a flexible coupling for connecting a driven shaft and a driving shaft, a hub member secured to said driven shaft and a second hub member secured to said driving shaft, each of said hub members having an eccentric part secured thereto with its axis of eccentricity displaced from the axis of eccentricity of the other eccentric part, a pair of substantially hemispherical pivot members, each surrounding a hub member and its shaft and having an eccentric bearing recess substantially conforming to and receiving the eccentric part of its respective hub member, said pivot members together substantially forming a sphere, a pair of mating housing members each having a substantially hemispherical recess substantially conforming to and receiving one of said pivot members, means securing said housing members together, and means effecting a driving connection between said pivot members and said housing members.

10. In a flexible coupling for connecting a driven shaft and a driving shaft, a hub member secured to said driven shaft and a second hub member secured to said driving shaft, each of said hub members having an eccentric part secured thereto with its axis of eccentricity displaced from that of the other, a pair of substantially hemispherical pivot members, each surrounding a hub member and its shaft and having an eccentric bearing recess substantially conforming to and receiving the eccentric part of its respective hub member, said pivot members together substantially forming a sphere, a pair of mating housing members each having a substantially hemispherical recess substantially conforming to and receiving one of said pivot members, means securing said housing members together, and radial spline means in lost-motion relationship for effecting a driving connection between said pivot members and said housing members.

WILLIAM CURETON.

REFERENCES CITED

The following references are of record in the file of this patent:

UNITED STATES PATENTS

| Number | Name | Date |
| --- | --- | --- |
| 2,136,947 | Morgan | Nov. 15, 1938 |
| 2,467,902 | McPhee | Apr. 19, 1949 |
| 2,496,702 | Dykman et al. | Feb. 7, 1950 |